Jan. 10, 1950 E. H. WEBER, JR 2,494,323

SIGNAL RECEIVING APPARATUS

Filed March 12, 1943

INVENTOR
E. H. Weber, Jr.
BY Jefferson Ehrlich
ATTORNEY

Patented Jan. 10, 1950

2,494,323

UNITED STATES PATENT OFFICE 2,494,323

SIGNAL RECEIVING APPARATUS

Edward Henry Weber, Jr., Toms River, N. J., assignor to American Telephone and Telegraph Company, a corporation of New York Application March 12, 1943, Serial No. 478,881

3 Claims. (Cl. 250—20)

Figures 1, 2, 3:
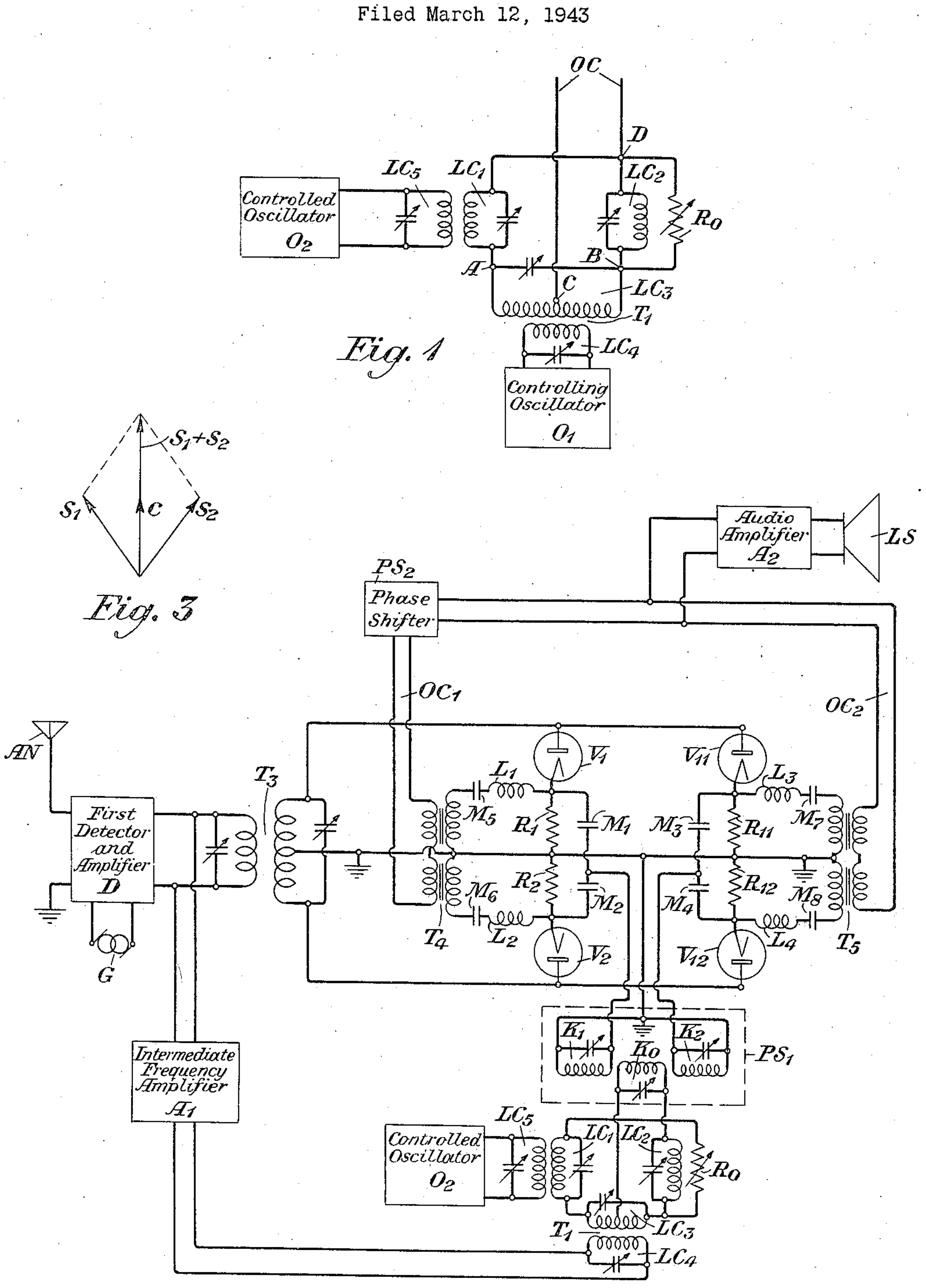

This invention relates to oscillation generators and to circuits and apparatus for controlling the frequency of the current supplied by oscillation generators. This invention also relates to signaling systems, and more particularly to radio receiving systems, and is especially suitable for use in broadcast receivers.

In the reception of double side band amplitude modulated radio signals, the usual methods of demodulation introduce considerable harmonic distortion of the modulation frequencies especially during certain phases of selective fading. This type of distortion may be noticeable when the received carrier frequency fades below the level of the received side bands. It may also be noticeable when the phase relationships between the carrier frequency and the side bands, or between the upper and lower side bands, are such that the modulation frequencies obtained by interaction of the carrier and the lower side band are out of phase with those modulation frequencies resulting from interaction of the carrier and the upper side band. In these cases harmonic distortion may result from the interaction of the two side bands, and it may render the signals unintelligible to a considerable extent.

It has been recognized that a balanced type of demodulator in which the carrier frequency is resupplied by a local oscillator at the receiving station is preferred for improved quality of signal reproduction. This has not found practical application in double side band signaling systems, however, because of the difficulty of accurately maintaining an exact frequency and phase relationship between the current of the local oscillator and the currents of the received side band frequencies.

In order to obtain a considerably improved receiving system, it is proposed to employ at the receiver a controlled oscillator for supplying current for the demodulation of the two sidebands received. The arrangement of this invention involves a circuit connected to the local oscillator for receiving the carrier wave emitted by the distant station and so applying the received carrier to the local oscillator as to change the frequency of the local oscillator in accordance with the random changes in the frequency of the carrier wave. By maintaining a synchronous relationship between the frequency of the locally generated current and the frequency of the received carrier wave, the second harmonic distortion above referred to will be considerably reduced, if not entirely eliminated.

The oscillator control circuit of this invention comprises a Wheatstone or balanced bridge arrangement interconnecting the local oscillator with the circuit that receives the carrier current. The received carrier current is caused to control and vary the frequency and phase of the local oscillator carrier in accordance with the received carrier current. This involves connecting the circuit containing the controlling carrier current to one of the diagonals of the balanced or Wheatstone bridge system and connecting the local oscillator to one of the arms of the bridge. The controlled current of the local oscillator is then fed through the opposite diagonal of the bridge to a load circuit. In this arrangement the circuit having the controlling carrier current and the output circuit having the controlled current generated by the local oscillator are in conjugate relationship with each other. The controlled oscillator then transmits current through the output circuit at a frequency which is substantially equal to the frequency of the current supplied by the controlling carrier current received, the controlled frequency remaining equal to the controlling frequency within narrow limits.

This invention will be better understood from the more detailed description hereinafter following, when read in connection with the accompanying drawing in which Figure 1 illustrates the oscillator control system of this invention, Fig. 2 illustrates a broadcast receiving system in which the oscillating circuit of Fig. 1 forms an essential part, and Fig. 3 shows a vector diagram to assist in understanding certain of the features of the invention.

Referring to Fig. 1 of the drawing, the reference characters $O_1$ and $O_2$ designate the controlling and controlled oscillators, respectively. The oscillator $O_2$ will generate current of its own frequency, which may be variable within limits, the frequency variation being equal to or greater than the frequency variation of the current generated by oscillator $O_1$. But when the oscillator $O_1$ supplies current, the oscillator $O_2$—which is coupled to oscillator $O_1$ through the bridge circuit arrangement to be described—will lock the oscillator $O_2$ in step therewith, as will be explained hereinafter. Oscillator $O_2$ may, for example, comprise any well known type of low Q vacuum tube oscillating system.

The balanced or Wheatstone bridge circuit interconnecting the oscillators $O_1$ and $O_2$ includes a tuned circuit $LC_1$ as one of its arms, a second tuned circuit $LC_2$ as another of its arms, and a tuned circuit $LC_3$ the winding of which may be the secondary winding of a transformer $T_1$.

The winding of circuit $LC_3$ is divided into two parts which comprise the other two arms of the bridge. The controlling oscillator $O_1$ is connected to a tuned circuit $LC_4$ the winding of which may comprise the primary winding of transformer $T_1$. The tuned circuits $LC_3$ and $LC_4$ are coupled to each other so as to impress the alternating voltage of oscillator $O_1$ upon the diagonal A—B of the bridge. The oscillator $O_2$ is coupled by circuit $LC_5$ to the circuit $LC_1$, the the oscillator $O_2$ being in effect connected to one of the arms of the bridge. The output circuit OC is connected to the other diagonal C—D of the bridge.

At any one instant the oscillator $O_1$ in applying voltage to the diagonal A—B of the bridge will cause current to flow serially through circuits $LC_1$, $LC_2$ and $LC_3$, and, therefore, through all four arms of the bridge. The voltage generated across tuned circuit $LC_1$ will send current through the output circuit OC in one direction, and the voltage generated across tuned circuit $LC_2$ will send current through the output circuit OC in the opposite direction. As these opposing currents in the output circuit OC are of equal magnitude, the resultant current through the output circuit OC due to the current supplied by the oscillator $O_1$ will be practically negligible.

The voltage generated across the tuned circuit $LC_1$ will also be applied to the oscillator $O_2$. This voltage will act to lock the oscillator $O_2$ in step with oscillator $O_1$, so that the waves of the two oscillators are in synchronism with each other. The current of oscillator $O_2$ will, therefore, be changed in frequency to be equal to the frequency of the current supplied by oscillator $O_1$ but having a phase difference therebetween. The current of the oscillator $O_2$, being supplied to the arm $LC_1$ of the bridge, will then be transmitted to the output circuit OC.

It will be observed that the oscillator $O_1$ and the output circuit OC are connected to the opposite diagonals of the bridge which are in conjugate relationship with each other. Because of this conjugate relationship, none of the current of oscillator $O_1$ will traverse the output circuit OC and, likewise, none of the current of the output circuit OC will have any effect upon the oscillator $O_1$. The oscillator $O_2$, however, will alone supply current to the output circuit OC. The frequency of oscillator $O_2$ will continually follow the frequency of oscillator $O_1$ and remain substantially in synchronism therewith. The current of oscillator $O_2$ will, moreover, remain substantially constant in amplitude, although the frequency of this current will vary in step with the current of oscillator $O_1$. The current supplied by oscillator $O_2$ will appear in the output circuit OC with substantially constant amplitude for practical purposes.

Oscillator $O_1$ may be considered a stable oscillator and oscillator $O_2$ an unstable oscillator. The bridge circuit is used to so connect these oscillators to each other that the unstable oscillator $O_2$ will quickly respond to frequency changes in the more stable oscillator $O_1$, and at the same time remain substantially unaffected by amplitude variations of the current of oscillator $O_1$ within certain limits. The bridge circuit is also employed to feed the controlled current of oscillator $O_2$ to the output circuit OC, and this output circuit current will at the same time be substantially nonresponsive to amplitude changes in the current of oscillator $O_1$.

In Fig. 1 the circuits $LC_1$, $LC_2$ and $LC_5$ may be tuned, for example, to the normal frequency of the current produced by the oscillator $O_2$, i. e., the frequency of the current generated by oscillator $O_2$ when it is unaffected by external conditions. The tuned circuits $LC_3$ and $LC_4$ may be tuned to the normal frequency of the oscillator $O_1$. The normal frequencies of both oscillators $O_1$ and $O_2$ are preferably designed to be equal although they may be somewhat different from each other. The resistor $R_0$ may be employed to balance the bridge with respect to the output resistance offered by the oscillator $O_2$. Although the bridge interconnecting the two oscillators is shown to include a number of tuned circuits it will be understood that the elements of the bridge may be composed of any other well known types of impedances, the only requirement being that the bridge be balanced at all frequencies that are to be transmitted by oscillator $O_2$ to the output circuit OC. Either circuit $LC_5$ or both circuits $LC_1$ and $LC_5$ may form part of oscillator $O_2$, if desired.

In Fig. 2 there is shown a form of radio receiving system suitable for receiving from a distant point double side-band signals which accompany a carrier, the received sidebands and the carrier being impressed upon the antenna circuit AN. These currents may be combined with the current of a local oscillator or generator G in a detector-amplifier D and the resulting products of demodulation will appear in the output circuit of the device D. These products of demodulation will include the two sidebands and the carrier wave all reduced in the frequency spectrum to intermediate frequencies, as is well known. These intermediate frequencies may be amplified by amplifier $A_1$ and fed with considerable amplitude into the bridge circuit which may be of the same type shown in Fig. 1. At the same time the two sidebands and the carrier are supplied through transformer $T_3$ to two balanced demodulators $V_1$, $V_2$ and $V_{11}$, $V_{12}$, which may also be referred to as differential demodulators. As will be explained hereinafter, the two balanced demodulators will receive the sidebands in equal phases and they will also receive the wave of the locally controlled oscillator $O_2$ in two different phases, and the products of the two demodulators will be fed into the output circuits $OC_1$ and $OC_2$, respectively. The amplitude of the wave supplied by oscillator $O_2$ will be much larger than the amplitude of the intermediate frequency carrier wave transmitted through transformer $T_3$ with the sidebands.

The carrier current amplified by amplifier $A_1$ will be employed to control the frequency of the current generated by the controlled oscillator $O_2$, as already described with regard to Fig. 1. The current of the oscillator $O_2$—which is controlled by the received carrier current—will be impressed upon the tuned circuit $K_0$ which may be part of a phase adjusting apparatus $PS_1$ of any well known type. The phase adjusting apparatus $PS_1$ may include two additional tuned circuits $K_1$ and $K_2$ which are so tuned that the voltages appearing across circuits $K_1$ and $K_2$ at the intermediate frequency will differ by 90 degrees. These two carrier voltages may be obtained, for example, by tuning the circuit $K_1$ to one side of the intermediate carrier frequency current to introduce a negative or lagging phase shift of, for example, 45 degrees, while the tuned circuit $K_2$ may be tuned to the other side of the carrier to obtain a positive or leading phase displacement of the complementary angle of, for example, 45 degrees. Thus the phase adjusting apparatus in effect produces two currents of the intermediate frequency, the phases of which are 90 degrees apart. The current of the lagging phase in circuit $K_1$ will be supplied to the balanced demodulator $V_1$, $V_2$ by connecting the tuned circuit $K_1$ to the terminal common to the condensers $M_1$ and $M_2$. Hence this current will flow through condenser $M_1$, tube $V_1$, the upper half of the secondary winding of transformer $T_3$ to ground, ground being also connected to circuit $K_1$ to complete the circuit. This same current of lagging phase will traverse the other half of the demodulator $V_1$, $V_2$ over a circuit which includes condenser $M_2$, tube $V_2$, the lower half of the secondary winding of transformer $T_3$, and ground. Similarly the current in coil $K_2$—which is of leading phase—will be transmitted through condensers $M_3$ and $M_4$ over similar circuits to the two halves of the balanced demodulator $V_{11}$, $V_{12}$ for the demodulation process which will be performed by demodulator $V_{11}$, $V_{12}$.

The sidebands in the intermediate frequency range received by transformer $T_3$ from detector D are impressed upon both demodulators $V_1$, $V_2$ and $V_{11}$, $V_{12}$ with substantially the same amplitudes and in the same phase. As already noted, the carrier currents supplied to these two demodulators by coils $K_1$ and $K_2$ may be of similar amplitudes of large order but they are in phase quadrature. By virtue of the combination of the currents of the sidebands received from transformer $T_3$ and of the carrier received from coil $K_1$, all of which are impressed upon the demodulator $V_1$, $V_2$, there will be established currents corresponding to the products of demodulation which will flow through the resistors $R_1$ and $R_2$. The currents through resistors $R_1$ and $R_2$ will be of the audible frequencies and they will be of equal amplitudes. The voltages of the audible or demodulation frequencies appearing across resistor $R_1$ will be transmitted through the choke coil $L_1$ and condenser $M_5$ to the upper half of the primary winding of transformer $T_4$. Similarly the voltages of the audible frequencies appearing across resistor $R_2$ will be transmitted through the choke coil $L_2$ and condenser $M_6$ to the lower half of the primary winding of transformer $T_4$. The choke coils $L_1$ and $L_2$ will prevent the passage of the carrier current and of the products of demodulation of frequencies above the upper limit of the demodulated band to be transmitted to the primary winding of transformer $T_4$. Similarly, the currents of the sidebands received from transformer $T_3$ and of the carrier received from coil $K_2$ will be impressed upon the two branches of the balanced demodulator $V_{11}$, $V_{12}$ and will cause voltages of the audible or demodulation frequencies to appear across resistors $R_{11}$ and $R_{12}$. These voltages will likewise cause audible frequency currents to flow through the respective circuits including coil $L_3$ and condenser $M_7$ and coil $L_4$ and condenser $M_8$ to the primary windings of transformer $T_5$ respectively, and these currents will also be of equal magnitudes.

Inasmuch as the received signals are applied from transformer $T_3$ to both balanced demodulators with equal amplitudes and in the same phase while the locally generated carrier frequencies from coils $K_1$ and $K_2$ are supplied to the two demodulators in phase quadrature, as already pointed out, the outputs of the two demodulators appearing in the output circuits $OC_1$ and $OC_2$ will be in phase with each other. The output levels of the currents in the output circuits $OC_1$ and $OC_2$ may differ from each other, the difference in the levels being dependent upon the phase relationship between the sidebands applied to the two demodulators and the locally supplied carrier current of oscillator $O_2$. When the locally supplied carrier is in proper phase with the received sidebands in one of the balanced demodulators, such as $V_1$, $V_2$, the audio frequency output level in output circuit $OC_1$ will be approximately at its maximum value while the output level in the output circuit $OC_2$ of the other demodulator $V_{11}$, $V_{12}$ will be approximately at its minimum value due to the 90-degree phase difference in the carrier wave combined with the same sidebands in the demodulator $V_{11}$, $V_{12}$. If the carrier of oscillator $O_2$ supplied through circuit $K_1$ to the demodulator $V_1$, $V_2$, is for example, at a 45-degree displacement in phase from the received sidebands, then the same phase displacement of 45° will exist in the other demodulator and in that case the output of each of the demodulators will be somewhat less than its maximum value, namely, about seven-tenths of the maximum value, and the output of the two demodulators will be approximately equal to each other.

The currents in output circuit $OC_1$ are transmitted through a phase shifting apparatus $PS_2$ and after undergoing a 90-degree phase shift in apparatus $PS_2$, these currents are combined with the currents in output circuit $OC_2$. The combined currents are amplified by amplifier $A_2$ and are reproduced by loud speaker LS.

In the above discussion the term "phase" has sometimes been used to indicate a relationship between voltages of different frequencies. As is well known, a carrier modulated by a single frequency consists of the carrier frequency and two side frequencies, one sideband on either side of the carrier and spaced from the carrier by the modulating frequency. When the phase relationship of two such frequencies is referred to, the instantaneous vector relationship is meant.

As is well known, when a carrier is modulated by a single frequency, the resulting modulated carrier can be considered as composed of three frequencies, one a frequency equal to the carrier, the second a frequency equal to the carrier minus the modulating frequency (known as the lower side frequency or sideband) and the third a frequency equal to the carrier plus the modulating frequency (known as the upper side frequency or band). For the purpose of explanation consider the vector diagram of Fig. 3 in which the vector C is the carrier and vectors $S_1$ and $S_2$ are the upper and lower side frequencies respectively. All of these vectors are rotating in the same direction, each vector rotating at a rate equal to its frequency.

As far as vector relations are concerned the carrier vector C might be considered for the purpose of simplifying the explanation as stationary and the other vectors $S_1$ and $S_2$ as rotating in opposite directions, each at a rate equal to the modulating frequency. This is equivalent to subtracting the carrier frequency C from all frequencies C, $S_1$ and $S_2$. The vector relation in Fig. 3 is such that when vector $S_1$, rotating clockwise, reaches the position of the carrier vector C, the vector $S_2$, rotating counter-clockwise, will simultaneously reach the position of vector C. It will be noted that this is equivalent to having the vector sum of $S_1$ and $S_2$ always in phase with, or in phase opposition to, the carrier C as shown in Fig. 3. If the carrier vector C is displaced in phase in respect to the position shown, without affecting the side frequency vectors $S_1$ and $S_2$ equally, thus producing a small phase angle between the new position of the carrier C and the position of the vector sum of $S_1$ and $S_2$, the demodulated output signal which would be produced by simply passing the carrier C and the sidebands $S_1$ and $S_2$ through a demodulating device such as a rectifier, under the aforesaid conditions of phase displacement, will be reduced in amplitude in proportion to the cosine of the angle between the new carrier position and the position of the vector sum of $S_1$ and $S_2$. This will produce undesired amplitude changes in the demodulated signal and harmonic distortion. The arrangement shown in Fig. 2 is intended to overcome the undesired changes resulting from variations in the phase relation of the carrier and sidebands.

One of the primary features of the circuit arrangement of Fig. 2, as already noted, is to obtain a constant output from the demodulating system, i. e. an output which is independent of the phase relation between the current of oscillator $O_2$ and that of the intermediate carrier frequency. In the arrangement of the two balanced demodulators shown in the drawing, the outputs of these demodulators may be combined to yield a constant or substantially constant output of demodulated signal.

In either of the demodulators $V_1$, $V_2$ or $V_{11}$, $V_{12}$ the demodulated output will be dependent on the phase relationship between the carrier supplied by the oscillator $O_2$ through coils $K_1$ and $K_2$ and the sideband frequencies. When the resupplied carrier current of oscillator $O_2$ is in phase with the vector sum of the two sidebands as shown in Fig. 3, the demodulated signal will be at a maximum. If the phase of the resupplied carrier of oscillator $O_2$ departs from the desired phase relationship, the amplitude of the demodulated output in either output circuit $OC_1$ or $OC_2$ will decrease and the magnitude of the output will be in proportion to the cosine of the phase angle of departure. If, as has been postulated, carriers are supplied to the two sets of demodulators $V_1$, $V_2$ and $V_{11}$, $V_{12}$ from the oscillator $O_2$ through coils $K_1$ and $K_2$ so that the carrier voltages have a phase quadrature relation therebetween, the demodulated output from one of the demodulators, such as $V_1$, $V_2$, will be proportional to the cosine of the angle between the carrier position and the position of the vector sum of the sidebands. The output of the other demodulator $V_{11}$, $V_{12}$ will be proportional of the sine of the same angle.

Consider for the moment that the demodulators $V_1$, $V_2$ and $V_{11}$, $V_{12}$ are arranged to be such that the rectified output varies directly with the amplitude of the alternating input voltage. If the amplitude of the output in the circuit $OC_1$ from demodulator $V_1$, $V_2$ varies as the cosine of the angle above-mentioned, then the amplitude of the output of the circuit $OC_2$ will vary as the sine of this angle.

It is to be noted that the phase difference between the audio output frequencies in circuit $OC_1$ and circuit $OC_2$ is zero at all times. The amplitude in each output circuit will go through all variations in magnitude from plus unity to minus unity and back to plus unity as the angle above-discussed varies through 360 degrees. There will thus be certain angles for which the positive amplitude from one circuit such as $OC_1$ will cancel the negative amplitude from the other circuit such as $OC_2$ if they are added directly. By inserting a 90° phase shift by means of apparatus $PS_2$ in the audio frequency current in one of the circuits such as $OC_1$, it then becomes impossible to obtain different magnitudes in the two circuits which will add up to zero. Actually, the sum will be substantially constant for all positive and negative magnitudes that would obtain in the two output circuits at any time. This is one of the desired results of the Fig. 2 arrangement as already noted.

The phase shifting apparatus $PS_2$ may be any circuit of well known type designed for introducing the required phase shift. It may be, for example, a modulator-demodulator system used for the same purpose, as will be understood by those skilled in the art. Moreover, it is not necessary that the entire 90° phase shift be introduced in one of the output circuits such as $OC_1$. If desired, complementary phase shifting circuits may be applied to the two output circuits $OC_1$ and $OC_2$.

In order to reduce the effect of one of the output circuits such as $OC_1$ upon the other output circuit $OC_2$, it may be desirable to interconnect these output circuits and the required phase shifting apparatus, through a balanced bridge or network of any well known type (not shown). This will render the two output circuits substantially independent of each other although the bridge circuit will properly combine the two outputs for transmission to the amplifier $A_2$ and loud speaker LS.

It is noted that the amplifier $A_1$ is inserted between the detector D and the circuit $LC_4$ to apply a sufficient voltage of the intermediate carrier frequency to the diagonal of the bridge for the control of the frequency of the local oscillator $O_2$. This amplifier serves not alone to increase the level of the current used to control the local oscillator $O_2$, but it acts also as a one-way valve to prevent the oscillator $O_2$ from feeding an alternating voltage back into the detector D and transformer $T_3$. If desired, the amplifier $A_1$ may include a selective circuit to accentuate the carrier obtained from detector D while reducing the effect of the sidebands present. The balanced bridge interconnecting amplifier $A_1$ and oscillator $O_2$ is employed to prevent the sidebands amplified by amplifier $A_1$ from reaching the coil $K_0$ which is connected to a diagonal of the bridge.

It will be understood that although the balanced demodulators $V_1$, $V_2$ and $V_{11}$, $V_{12}$ are shown as including two-electrode tubes, these demodulators may include tubes of other construction having additional electrodes and arranged in any manner well known in the art. Although the invention has been applied to a double sideband radio receiving system, it may equally well be applied to any form of wired circuit over which double sideband signals are transmitted.

Although various features of this invention have been shown in Fig. 2 as applied to a radio receiving system for receiving double sideband signals accompanying a carrier wave, these same features may also be applied to radio receiving systems in which both sidebands are transmitted and the carrier suppressed.

While this invention has been shown and described in certain particular embodiments merely for the purpose of illustration, it will be understood that the general principles of this invention may be applied to other and widely varied organizations without departing from the spirit of the invention as defined in the appended claims.

What is claimed is:

1. In a receiving system for demodulating the signals conveyed by two received sidebands corresponding to the same signal and a carrier wave accompanying said sidebands, the combination of two differential demodulator circuits, each of said demodulator circuits having a differential low frequency output, means for applying said sidebands to said differential demodulator circuits in parallel with each other, an oscillator adapted to be controlled in frequency by the frequency of said carrier wave, a balanced bridge of linear impedance elements for supplying said oscillator with a current produced by said carrier wave for frequency control of said oscillator, said oscillator being connected to an arm of said bridge and said carrier wave being applied to one diagonal of said bridge, means coupled to the other diagonal of said bridge for deriving from the output of said oscillator two waves of the same frequency which are in quadrature with each other, means for applying said two derived waves respectively to each of said differential demodulator circuits such that in each case the phase relation between the derived wave and the sidebands is reversed in one branch of each differential demodulator circuit with respect to the corresponding phase relation in the other branch, means for combining the outputs of said differential demodulator circuits to form a combined output signal, said last mentioned means including a phase changing apparatus adapted to introduce a 90° phase shift in the output of one of said differential demodulator circuits before combination with the output of the other of said differential demodulator circuits.

2. In a receiving system for demodulating the signals conveyed by two received sidebands of the same signal and a carrier wave accompanying said sidebands, the combination of an oscillator, means for controlling the frequency of said oscillator in accordance with the frequency of said carrier wave, two differential demodulator circuits, means for applying said sidebands to said differential demodulator circuits in parallel with each other, said last mentioned means being adapted to apply said sidebands to each side of said differential demodulator circuits in phase opposition with respect to the other side thereof, each of said demodulator circuits having a differential low frequency output circuit, means for deriving from the wave of said oscillator two waves of the same frequency which are in quadrature with each other, means for applying said two derived waves respectively to each of said differential demodulator circuits including means for applying each of said derived waves to both branches of one of said differential demodulator circuits in the same phase, means for combining the outputs of said differential demodulator circuits to form a combined output signal, said last mentioned means including a phase changing apparatus adapted to introduce a 90° phase shift in the output of one of said differential demodulator circuits before combination with the output of the other of said differential demodulator circuits.

3. In a receiving system for demodulating double sideband signals associated with a carrier wave, the combination of two differential demodulator circuits, each of said differential demodulator circuits having a differential low frequency output, means for applying said signals to said differential demodulator circuits in parallel with each other, means for deriving from said carrier wave two waves of the same frequency which are in quadrature with each other, means for simultaneously applying said two derived waves respectively to each of said differential demodulator circuits such that in each case the phase relation between the derived wave and the sidebands is reversed in one branch of each differential demodulator circuit with respect to the corresponding phase relation in the other branch, a phase changing apparatus adapted to introduce a 90° phase shift in the output of one of said differential demodulator circuits, and an output device adapted to respond to the sum of (*a*) the output of said phase changing apparatus and (*b*) the output of the other of said demodulator circuits.

EDWARD HENRY WEBER, Jr.

REFERENCES CITED

The following references are of record in the file of this patent:

UNITED STATES PATENTS

| Number | Name | Date |
|---|---|---|
| 1,828,498 | Heising | Oct. 20, 1931 |
| 1,849,884 | Peterson | Mar. 15, 1932 |
| 2,019,446 | Crosby | Oct. 29, 1935 |
| 2,040,221 | Tubbs | May 12, 1936 |
| 2,044,745 | Hansell | June 16, 1936 |
| 2,073,409 | Shanklin | Mar. 9, 1937 |
| 2,104,801 | Hansell | Jan. 11, 1938 |
| 2,179,872 | Wilbur | Nov. 14, 1939 |
| 2,231,704 | Curtis | Feb. 11, 1941 |
| 2,242,791 | Ohl | May 20, 1941 |
| 2,248,481 | Schuttig | July 8, 1941 |
| 2,278,690 | Clark | Apr. 7, 1942 |
| 2,358,610 | Weber | Sept. 19, 1944 |
| 2,377,894 | McCool | June 12, 1945 |